United States Patent Office 3,440,203
Patented Apr. 22, 1969

3,440,203
POLYAMIDE ACID SOLUTION CONTAINING A SILICONE AND SURFACE COATED WITH SAID SOLUTION
Edith M. Boldebuck and Joseph Sonnenberg, Schenectady, N.Y., assignors to General Electric Company, a corporation of New York
No Drawing. Filed May 5, 1966, Ser. No. 547,725
Int. Cl. C08g 51/34, 20/32
U.S. Cl. 260—33.4                               11 Claims

ABSTRACT OF THE DISCLOSURE

An improved polyamide acid coating solution which has reduced surface roughness is produced when small amounts of a silicone are added to the reaction produce of a benzophenone dianhydride and a diamine in cresol or a mixture of cresol-phenol. These polyamide acid solutions are useful in producing insulating films over conducting cores, in producing capacitor dielectrics, etc.

---

This invention relates to synthetic polymer compositions and methods for preparing such materials. More particularly, the invention is concerned with a polyamide acid solution which comprises (1) the product of reaction of a mixture of ingredients comprising (a) at least one benzophenone dianhydride (e.g., 2,2',3,3'-, 2,3,3',4'-, 3,3',4,4'-benzophenonetetracarboxylic acid dianhydride), (b) at least one diamine selected from the group consisting of m-phenylenediamine, and diamines having the formula

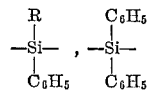

where R''' is a divalent radical selected from the group consisting of $C_{1-3}$ alkylene

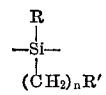

—O— and $$-\overset{O}{\underset{\|}{\underset{\|}{S}}}-$$
$$\phantom{-}\overset{\phantom{O}}{\underset{O}{\phantom{\|}}}$$

(2) a solvent for (1) selected from the group consisting of cresol and cresol-phenol, and (3) a silicone additive having the formula X—[D—O]$_a$—[D'—O]$_b$—D—X where X is selected from the group consisting of —(CH$_2$)$_n$COOH, —(CH$_2$)$_n$OH, —OH, OSiR$_3$,
—OSiR$_2$C$_6$H$_5$ and
—OSiR(C$_6$H$_5$)$_2$ D is selected from the group consisting of

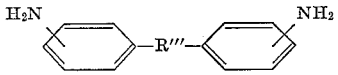

and

and

D' is selected from the group consisting of

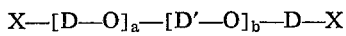

and

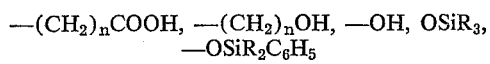

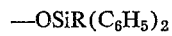

less than 50 percent of the total number of organic substituents in D and D' attached to silicon by Si—C bonds being phenyl groups; R is an alkyl radical consisting of $C_{1-4}$; R' is selected from the group consisting of —CN, and —COOR''; R'' is selected from the group consisting of hydrogen, R, $C_qF_{2q}H$, and $CF_3$; $a$ is a whole number in excess of one and preferably four to greater than one hundred; $b$ is a whole number from zero to less than twenty-five; $n$ is a whole number from one to four; and $q$ is a whole number from one to eleven. The invention includes also the formation of polymers and polymeric films through the subsequent application of further heating at higher temperatures.

U.S. Patent 3,179,614, issued Apr. 29, 1965, describes a class of resins comprising polyamide acid resins which are generally prepared by the reaction of a dianhydride of a tetracarboxylic acid with various diamines. The most widely used dianhydride is pyromellitic dianhydride, although this patent does describe a number of other dianhydrides. In accordance with this patent, the dianhydride and the diamine are reacted in the presence of a number of recited organic solvents for both the reactants and the intermediate polymeric acid amide. Additionally, this patent recites the need for employing solvents for the reaction which are relatively expensive and not readily available.

If cresol is used as the solvent in the preparation of a polyamide acid from a dianhydride such as benzophenone dianhydride and a diamine, the mixture must be heated to an elevated temperature of, for example, 100 to 160° C. to react the dianhydride and diamine since the initial reaction products are not soluble in this solvent at room temperature. Subsequent application of heat at higher temperatures of 250-300° C. produces films which are tough, flexible and heat resistant. However, as the solvent evaporates, many of these films develop surface irregularities described appropriately as "orange peel." Such irregularities or roughness are very pronounced. It would be desirable to form such a polyamide acid in cresol or cresol-phenol mixtures for coating purposes if the subsequent polymer or polymeric film had a minimized surface roughness. After shaping or coating a substrate, the polyamide acid would be readily converted to the polyimide form by chemical or thermal means to produce products having excellent solvent resistance and resistance to flow at elevated temperatures, and with a smooth surface.

Unexpectedly it has been discovered that it is possible to prepare such soluble polyamide acid resins in anhydrous solvents of the various cresols, e.g., ortho-, meta- and para-cresol and cresol-phenol mixtures, without the subsequent undesirable pronounced surface roughness in the resulting polymeric film. Commercially available cresol from coal tar is a mixture of isomers which is liquid at room temperature and is an ideal solvent for our process. The range for the cresol-phenol mixtures can be varied widely up to about 75% phenol in such mixtures; additionally, hydrocarbon diluents can be added to the solvent. What is equally significant, it is possible to use such a relatively inexpensive solvent to make the polyamide acid resin in solution by heating to a temperature of 100–160° C. when the reactants go into solution rapidly to produce a viscous polymeric solution, which remains liquid and homogenous at room temperature with the silicone additive therein. Such a solution is readily cast on a substrate, heated initially to evaporate the solvent and produce a smooth film, which is cured subsequently at a higher temperature to provide a polyimide with a smooth surface.

The above results were entirely unexpected and in no way could have been predicted because small amounts of various surfactants or additives normally used as surface regulators for many types of polymers in aqueous systems or in organic solvents and which are known to be useful for minimizing surface roughness in films cast from such solutions produced no improvement in polyimide films cast from phenolic solvents or produced further undesirable effects such as haziness in the cured films. Furthermore, the silicone additives which we found effective in smoothing the surface of polymer film from cresol or cresol-phenol solvents were not even previously known as or considered to be surfactants in phenolic type solvents.

It is important that one employ benzophenone dianhydrides with the diamine and with the above silicone additive in order to obtain the above-described end results. If one employs instead of these dianhydrides, pyromellitic dianhydride (which is the preferred dianhydride in the above-mentioned U.S. Patent 3,179,614) with the above additive in a cresol or cresol-phenol solvent, the reactants are either not soluble in the aforesaid mixture and precipitate, or the reaction product does not provide a desirable coating solution.

In carrying out the reaction it is preferable to add a heated solution of the dianhydride and the cresol or cresol-phenol solvent to a heated solution of the diamine and the cresol or cresol-phenol solvent. The mixture is then agitated as a temperature of from about 100° to 160° C. until a homogenous solution is obtained and subsequenlty cooled to room temperature. The silicone additive is added to the solution and stirred to give a clear, homogenous solution.

Various silicone additives have been found useful for incorporating in the above cresol and cresol-phenol solvents. These additives, which are within above Formula I, can be added in a preferred range of from 0.06 to 0.3 weight percent silicone based on polyimide solids, or in a preferred range of from 0.01 to 0.05 weight percent silicone based on a 17 weight percent polyimide solution. Of these silicone additives, we prefer to use a dimethyldiphenylsiloxane polymer with terminal silanol groups or a dimethylsiloxane polymer with terminal carboxy-alkyl groups which provided films with a glassy or mirror-smooth surface. Additional silicone additives within Formula I which provide desirable smooth surfaces for the above films or coatings include dimethylsiloxane polymers with terminal hydroxy-alkyl groups, dimethylsiloxane polymers with terminal silanol groups, dimethylsiloxanes with terminal trimethylsiloxane groups, dimethylsiloxanes with terminal dimethylphenylsiloxane groups, dimethylsiloxanes with terminal methyldiphenylsiloxane groups, methylbutylsiloxanes with terminal trimethylsiloxane groups, dimethyldiphenylsiloxanes with terminal trimethylsiloxane groups, dimethylmethylphenylsiloxane copolymers terminated with trimethylsiloxane groups, methylphenylsiloxanes with terminal trimethylsiloxane groups, β-cyanoethylmethyl-dimethylsiloxane copolymers with tri-methylsiloxane end groups, β-carboxyethylmethyl-dimethylsiloxane copolymers with trimethylsiloxane end groups, methylesters of β-carboxyethylmethyl-dimethylsiloxane copolymers with trimethylsiloxane end groups, and fluoroesters of β-carboxyethylmethyl-dimethylsiloxane copolymers with trimethylsiloxane end groups.

Various diamines have been found useful for reacting with the above described dianhydrides. Of the various diaminobenzenes, m-phenylenediamine will give polymers with the carbonyl-dipthalic anhydrides which are soluble in the phenolic solvents. Of the various binuclear diamines, those diamines in which one amino group is on each of the phenyl groups and the phenyl groups are separated by an alkylene, carbonyl, oxygen or sulfonyl radical will give polymeric products with the dianhydrides which are soluble in the phenolic solvent. Typical examples of such diamines are the various isomeric ortho-, meta- and para-oxydianilines, e.g., 2,2'-oxydianiline, 3,3'-oxydianiline, 4,4'-oxydianiline, 2,3'-oxydianiline, 2,4'-oxydianiline, 3,4'-oxidianiline, etc., the alkylenedianilines, especially those in which the alkylene group has from one to three carbon atoms, e.g., methylenedianiline, ethylidenedianiline, ethylenedianiline, propylidenedianiline, isopropylidenedianiline, propylenedianiline, etc., including the various ortho-, meta- and para-isomers thereof, the various ortho-, meta- and para-isomers of diaminobenzophenone, and the various ortho-, meta- and para-isomers of sulfonyldianiline. Of these diamines, m-phenylenediamine (m-PDA), 4,4'-oxydianiline (ODA), 4,4'-methylenedianiline (MDA), and 4,4'-sulfonyldianiline are the most readily available.

Of the various dianhydrides, the most readily available and preferred dianhydride is 3,3', 4,4'-benzophenonetetracarboxylic acid dianhydride (BPDA). These dianhydrides may be made in the manner described in U.S. 3,078,279, McCracken et al.

In forming the polymeric products it is only required to mix one or more of the dianhydrides with one or more of the above named diamines in the presence of the liquid cresol or cresol-phenol solvent; they go into solution rapidly upon heating to a temperature range of 100–160° C. and appear to react in a short period of time to produce a polymeric amide acid solution which remains liquid and homogeneous at subsequent room temperature with one or more of the above silicone additives of Formula I added thereto. If desired, an inert atmosphere, e.g., nitrogen, can be used in the reaction vessel to retard oxidation of the amines to produce lighter colored polymers. Monoamines such as aniline, p-biphenylamine, benzylamine, or anhydrides of a dicarboxylic acid, such as phthalic anhydride, or maleic anhydride, or other reagents reactive with amines or carboxylic acids may be used to chain-stop or modify the polymers. These may be added at the start, during, or at the end of the polymer-forming reaction and may be used to react with any slight excess of either the diamine or dianhydride used initially.

The amount of solvent used should be sufficient to produce a homogenous solution with the reactants and polyamide acid polymer, and yet not be too viscous so as to introduce handling problems. If too much solvent is used, the cost advantage over other more expensive solvents is reduced. Optimum concentrations are in the range of 5 to 40 percent, by weight, polymer and 60 to 95 percent, by weight, solvent mixture, based on the end-use.

In order that those skilled in the art may better understand how the invention may be practiced, the following examples are given by way of illustration and not by way of limitation. All percentages are by weight, unless otherwise stated. Anhydrous conditions were maintained at all times.

EXAMPLE 1

In this example, a heated solution containing 49.94 grams BPDA and 155.8 grams cresol was added rapidly to a heated solution containing 16.75 grams m-PDA and 169.6 grams cresol. The mixture was agitated for a short time at a temperature of 125° C. until a homogenous solution was obained, and was then cooled rapidly to room temperature. When this viscous polymer solution was cast on a glass substrate and heated on a hot plate held at 115° C., the surface of the polymer film became rough as the solvent evaporated, and subsequent heating at 250°

C. did not remove the "orange peel" surface on the cooled film.

A second solution containing 0.3 gram of dimethyldiphenylsiloxane with terminal silanol groups, the silicone additive, and 9.7 grams cresol was prepared. Five drops of the second solution, 0.090 gram, was added to 5 grams of the initial solution and stirred to give a third clear, homogenous solution. The third solution was cast on a glass substrate and heated on a hot plate at 115° C. until the solvent had evaporated. The dry film was transparent and had a glassy smooth surface. After further heating up to 250° C. to complete the cure of the polyimide, the film retained the glassy smooth, or mirror smooth, surface.

EXAMPLE 2

In this example, a solution containing 20.94 grams BPDA and 65.53 grams cresol was heated to 143° C. and was added rapidly to a solution containing 7.13 grams of m-PDA and 71.18 grams cresol, which had also been heated to 143° C. These solutions were mixed for about one minute and the resulting homogenous polymer solution was then cooled rapidly to room temperature. Five grams of this viscous polymer solution was mixed with 0.0027 gram of the silicone additive of Example 1 and 5.6 grams cresol to obtain a clear slightly viscous coating solution.

An eight-inch length of 50.8 mil clean copper wire was dipped into this latter solution and withdrawn at a speed of about five feet per minute. The coated wire was immediately suspended in a 250° C. constant-temperature air circulating oven for three minutes. A second and third coat of the solution were applied and cured in a similar manner. This multi-coated wire was very smooth. The coated wire was subsequently stretched to 125% of its original length, was then wound on its own diameter, and was examined under a microscope with 15× magnification. No cracks or craze marks could be seen. The surface of the wire was glassy smooth in appearance. There was no indication that any of the various insulation layers had delaminated.

Another identical copper wire was coated in the above manner but from the polyamide acid-cresol solution which contained no silicone additive. While the flexibility properties were similar to the above-described coated wire, the surface of the insulation appeared grainy and had inadequate smoothness.

EXAMPLES 3-16

In each of these Examples 3-16, 0.3 gram of a silicone fluid additive, which is set forth below in Table 1, was added to 9.7 grams cresol. Five drops of each of these solutions, 0.090 gram, were added separately to five grams of the initial solution prepared for Example 2 and containing BPDA, m-PDA and cresol. Subsequently, each sample was cast on a glass substrate and heated on a hot plate at 115° C. until the solvent had evaporated. Each of the films in Examples 3-16 had a smooth surface. Each dry film is heated further up to 250° C. to complete the cure of the polyimide. Additionally, the film prepared with the additive of Example 3 had a glassy smooth surface.

Table 1

| Example: | Silicone additive |
|---|---|
| 3 | Dimethylsiloxane polymer with terminal carboxyalkyl groups. |
| 4 | Dimethylsiloxane polymer with terminal hydroxyalkyl groups. |
| 5 | Dimethylsiloxane polymer with terminal silanol groups. |
| 6 | Dimethylsiloxane with terminal trimethylsiloxane groups. |
| 7 | Dimethylsiloxane with terminal dimethylphenylsiloxane groups. |
| 8 | Dimethylsiloxane with terminal methyldiphenylsiloxane groups. |
| 9 | Methylbutylsiloxane with terminal trimethylsiloxane groups. |
| 10 | Dimethyldiphenylsiloxane with terminal trimethylsiloxane groups. |
| 11 | Dimethyl - methylphenylsiloxane copolymer terminated with trimethylsiloxane groups. |
| 12 | Methylphenylsiloxane with terminal trimethylsiloxane groups. |
| 13 | β-Cyanoethylmethyl-dimethylsiloxane copolymer with trimethylsiloxane end groups. |
| 14 | β - Carboxyethylmethyl-dimethylsiloxane copolymer with trimethylsiloxane end groups. |
| 15 | Methylester of β-carboxyethylmethyl-dimethylsiloxane copolymer with trimethylsiloxane end groups. |
| 16 | Fluoroester of β-carboxyethylmethyl-dimethylsiloxane copolymer with trimethylsiloxane end groups. |

The optimum concentration range for the silicone additives were determined by adding, drop-wise, the three weight percent silicone solution in Example 1 to five grams of the initial solution of BPDA, m-PDA and cresol in Example 1. After each addition, the mixture was well stirred and a small portion of the homogenous solution was spread on a glass substrate and heated to dryness at 115° C. A second similar series of samples were prepared using the same silicone additive solution which was diluted, however, ten-fold, to 0.3 weight percent silicone in cresol. The weight of the silicone additive in each case was calculated from the known weight of one drop of the dilute silicone solution, making no correction for the very small amount of polyamide acid withdrawn to make the test slides.

The optimum useful range for the silicone additive fluid is from 0.06 to 0.3 weight percent silicone based on polyimide solids or from 0.01 to 0.05 weight percent silicone based on 17% polyimide solution. The following Table 2 shows the above resulting film of Example 1 in the range from 0.06 to 0.3 weight percent silicone based on polyimide solids providing smooth surfaces for the films.

TABLE 2

| Silicone solution added to 5 grams of initial solution | Grams silicone polymer per 100 g. polyimide solids | Nature of surface of polyimide film |
|---|---|---|
| 2 drops of 0.3% | 0.012 | Rough. |
| 5 drops of 0.3% | 0.03 | Do. |
| 10 drops of 0.3% | 0.06 | Glassy smooth. |
| 5 drops of 3% | 0.30 | Do. |
| 10 drops of 3% | 0.60 | Thick at periphery but smooth in center. |
| 15 drops of 3% | 0.90 | Rough. |
| 20 drops of 3% | 1.20 | Pebbly. |

EXAMPLE 17

In this example, a solution containing 11.28 grams BPDA and 43.76 grams cresol was heated to 111° C. and added rapidly to a solution containing 6.96 grams MDA and 45.23 grams cresol which had also been heated to 111° C. The solutions were mixed for 1.5 minutes until a homogenous solution was obtained, and was then cooled rapidly to room temperature. When this viscous polymer solution was cast on a glass substrate and heated on a hot plate held at 120° C., the surface of the polymer film became rough as the solvent evaporated.

A second solution containing 0.3 gram of dimethyldiphenylsiloxane with terminal silanol groups, the silicone additive, and 9.7 grams cresol was prepared. Five drops of the second solution were added to five grams of the initial solution and stirred to give a third clear, homogenous solution. The third solution was cast on a glass substrate and heated on a hot plate at 120° C. until the solvent had evaporated. The dry film was transparent and had a glassy smooth surface. After further heating up to 259° C. to complete the cure of the polyimide, the film retained the glassy smooth surface.

EXAMPLE 18

In this example, a solution containing 6.44 grams BPDA and 41.76 grams cresol was heated to 140° C. There was added rapidly to this solution 4.00 grams ODA. The solution was agitated for about two minutes at a temperature of 140° C. until a homogenous solution was obtained, and then cooled rapidly to room temperature. When this viscous polymer solution was cast on a glass substrate and heated on a hot plate held at 120° C., the surface of the polymer film became moderately rough as the solvent evaporated.

A second solution containing 0.3 gram of dimethyldiphenylsiloxane with terminal silanol groups, the silicone additive, and 9.7 grams cresol was prepared. Five drops of the second solution, was added to five grams of the initial solution and stirred to give a third clear, homogenous solution. The third solution was cast on a glass substrate and heated on a hot plate at 120° C. until the solvent had evaporated. The dry film was transparent and had a glassy smooth surface. After further heating up to 250° C. to complete the cure of the polyimide, the film retained the glassy smooth surface.

EXAMPLE 19

In this example, a solution containing 16.76 grams BPDA, 31.33 grams phenol and 16.87 grams cresol was heated to 86° C. and added rapidly to a solution containing 2.89 grams m-PDA, 33.55 grams phenol and 18.07 grams cresol, which had also been heated to 86° C. The mixture was agitated for about 1.5 minutes until a homogenous solution was obtained, and was then cooled rapidly to room temperature. When this viscous polymer solution was cast on a glass substrate and heated on a hot plate held at 120° C., the surface of the polymer film became moderately rough as the solvent evaporated.

A second solution containing 0.3 gram of dimethyldiphenylsiloxane with terminal silanol groups, the silicone additive, and 9.7 grams cresol was prepared. Two drops of the second solution was added to five grams of the initial solution and stirred to give a third clear, homogenous solution. The third solution was cast on a glass substrate and heated on a hot plate at 120° C. until the solvent had evaporated. The dry film was transparent and had a glassy smooth surface. After further heating up to 250° C. to complete the cure of the polyimide, the film retained the glassy smooth surface.

EXAMPLE 20

In this example, 5.01 grams of the initial solution from Example 2 were used. To this solution was added a hydrocarbon diluent, 0.45 gram of "Solvesso 100," an aromatic naphtha with a boiling point of 159–182° C., which is sold commercially by Humble Oil and Refining Company, Houston, Tex. A homogenous solution resulted which was cast on a glass substrate and heated on a hot plate held at 120° C., the surface of the polymer film became moderately rough as the solvent evaporated.

A second solution containing 0.3 gram of dimethyldiphenylsiloxane with terminal silanol groups, the silicone additive, and 9.7 grams cresol was prepared. Five drops of the second solution were added to 5 grams of the initial solution and stirred to give a third clear, homogenous solution. The third solution was cast on a glass substrate and heated on a hot plate at 120° C. until the solvent had evaporated. The dry film was transparent and had a glassy smooth surface. After further heating up to 250° C. to complete the cure of the polyimide, the film retained the glassy smooth, or mirror smooth, surface.

Although the utility of the polymer solutions of the present invention have been described in the above-mentioned patents principally in terms of applications as flexible films, it should be understood that these polymers may be used in other applications suitable for such compositions. Thus, these polyamide acid resins can be converted to polyimides and employed as surface coatings, as unsupported films and insulation over a conducting core. Additionally, these polyimides can be employed over a conducting core, previously coated with another polymer, or vice versa, to give laminated, insulated coatings on the wire to improve the properties of the insulation. They may also be used as dipping varnishes to impregnate coils of previously insulated wire, i.e., in the motor and generator rotors, field coils, etc. These resins may also be used in molding powder formulations by mixing with various fillers, for example, wood flour, diatomaceous earth, carbons, silica, abrasive grains, e.g., Carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc.

It will of course be apparent to those skilled in the art that other benzophenone dianhydrides and other diamines may be employed in place of those recited in the foregoing examples, many illustrations of these reactants being given previously, without departing from the scope of the invention. The ratio of reactants as well as the proportions of the solvent and additive may also be varied within the ranges recited above. It is also to be understood that the conditions of reaction, formation of intermediate polyamide acid, and of the ultimate polyimide product can also be varied widely in accordance with the intended invention. The incorporation of other additives, such as light stabilizers, oxidation inhibitors, viscosity control additives, etc., is not precluded.

What we claim as new and desire to secure by Letters Patent of the United States is:

1. A polyamide acid solution consisting essentially of (1) the product of reaction of a mixture of ingredients comprising (a) at least one benzophenone dianhydride, and (b) at least one diamine selected from the group consisting of m-phenylenediamine, and diamines having the formula

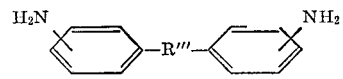

where R'' is a divalent radical selected from the group consisting of $C_{1-3}$ alkylene,

—O—and

(2) a solvent for (1) selected from the group consisting of cresol and cresol-phenol, and (3) from 0.06 to 0.3 weight percent of a silicone additive based on the total weight of (1) where said polyamide acid solution on curing produces a substantially amide free polyimide and said silicone additive having the formula $$X—(D—O)_a—(D'—O)_b—D—X$$

where X is selected from the group consisting of —OH, —OSiR$_3$, OSiR$_2$C$_6$H$_5$, and —OSiR(C$_6$H$_5$)$_2$; D is selected from the group consisting of

and

D' is selected from the group consisting of

and

less than 50 percent of the total number of organic substituents in D and D' attached to silicon by Si—C bonds being phenyl groups; R is an alkyl radical consisting of $C_{1-4}$; $a$ is a whole number from two to one hundred and $b$ is a whole number from zero to less than twenty-five.

2. A composition as in claim 1, in which the benzophenone dianhydride is 3,3',4,4' - benzophenonetetracarboxylic acid dianhydride.

3. A composition as in claim 1, in which the diamine is 4,4'-methylenedianiline.

4. A composition as in claim 1, in which the diamine is 4,4'-oxydianiline.

5. A composition as in claim 1, in which the diamine is m-phenylenediamine.

6. A composition as in claim 1, in which the diamine used is a mixture of m-phenylenediamine and 4,4'-methylenedianiline.

7. A composition as in claim 1, in which the benzophenone dianhydride is 3,3',4,4' - benzophenonetetracarboxylic acid dianhydride, the diamine is 4,4'-methylenedianiline, and the silicone additive is dimethyldiphenylsiloxane with terminal silanol groups within Formula I.

8. A surface coated with the heat-treated composition of claim 1.

9. A surface coated with the heat-treated composition of claim 1, in which the benzophenone dianhydride is 3,3',4,4'-benzophenonetetracarboxylic acid dianhydride.

10. A surface coated with the heat-treated composition of claim 1, in which the benzophenone dianhydride is 3,3',4,4'-benzophenonetetracarboxylic acid dianhydride, the diamine is 4,4'-methylenedianiline, and the silicone additive is dimethyldiphenylsiloxane with terminal silanol groups within Formula I.

11. An unsupported film obtained from the heat-treated composition of claim 1.

References Cited

UNITED STATES PATENTS

| 3,190,856 | 6/1965 | Lavin et al. | 260—65 |
| 3,277,043 | 10/1966 | Holub. | |
| 3,288,754 | 11/1966 | Green | 260—65 |

ALLAN LIEBERMAN, *Primary Examiner.*

U.S. Cl. X.R.

260—65, 78, 824; 117—124, 161, 232